United States Patent Office 3,595,815
Patented July 27, 1971

3,595,815
SELF-EXTINGUISHING PLASTICS
COMPOSITIONS
Herbert Willersinn, Ludwigshafen (Rhine), Germany, Rolf Dieter Rauschenbach, Bombay, India, and Rudolf Ilgemann, Hohensachsen, Germany, assignors to Badische Anilin- & Soda-Fabrik Aktiengesellschaft, Ludwigshafen (Rhine), Germany
No Drawing. Continuation-in-part of abandoned application Ser. No. 437,302, Mar. 4, 1965. This application Nov. 29, 1968, Ser. No. 780,222
Claims priority, application Germany, Mar. 6, 1964,
P 12 82 939.9–43
Int. Cl. C08f 47/10, 45/58, 45/62
U.S. Cl. 260—2.5
4 Claims

ABSTRACT OF THE DISCLOSURE

Self-extinguishing styrene polymers containing (a) an organic bromine compound and lead naphthenate or (b) an organic chlorine compound and iron naphthenate. The combinations (a) and (b) are exceedingly effective when used as flame-proofing agents.

---

This application is a continuation-in-part of application Ser. No. 437,302, filed Mar. 4, 1965, and now abandoned.

This invention relates to self-extinguishing plastics compositions and more particularly to plastics compositions which contain a styrene polymer, an organic bromine compound and lead naphthenate or an organic chlorine compound and iron naphthenate.

It is known that halogen-containing substances may be used as flame retardants for thermoplastic polymers. To achieve adequate flameproofing it is necessary to add relatively large amounts of halogen-containing substances to the polymers. Many of the properties of the polymers are, however, detrimentally affected in this way.

It is also known that the flame-retarding action of halogen-containing compounds may be enhanced by additives so that an adequate effect can be achieved with considerably smaller amounts of these substances. Thus it is possible to improve the flameproofing effect of organic bromine compounds by adding organic peroxides. Organic peroxides have the disadvantage that they are toxic and in some cases readily decompose explosively. Personnel with sensitive skins who handle such peroxides may contract dermatitis. Moreover, expensive and troublesome precautions must be taken in handling peroxides to avoid explosions. It is also known that peroxides slowly decompose even at room temperature so that stored products are no longer self-extinguishing. Moreover, it is also already known that chlorinated hydrocarbons may be used with antimony trioxide as flameproofing agents for thermoplastic polymers. It is a disadvantage that a relatively large amount of antimony trioxide is required so that the mechanical properties are deleteriously affected. Moreover, this substance cannot be added to the monomers in some methods of polymerization, for example bead polymerization, because it is not homogeneously distributed in the polymer.

We have now found that self-extinguishing plastics compositions do not have the said disadvantages when they contain:

(A) a styrene polymer,
(B) an organic chlorine or bromine compound as a flameproofing agent, and
(C) lead naphthenate where an organic bromine compound is used or iron naphthenate where an organic chlorine compound is used.

Styrene polymers (A) which are included within the scope of the invention are polystyrene and copolymers of styrene which contain at least 50% by weight of styrene units. Examples of copolymerization components are acrylonitrile, methacrylonitrile, esters of acrylic acid or methacrylic acid with alcohols having one to eight carbon atoms, fumaric esters of alcohols having one to eight carbon atoms, N-vinyl compounds, such as vinylcarbazole, vinylidene chloride, butadiene or also small amounts, for example, 0.5 to 0.01% by weight, of divinylbenzene.

Organic chlorine or bromine compounds (B) suitable as flameproofing agents should advantageously contain from 40 to 75% by weight of chlorine or bromine and at least four carbon atoms and should advantageously have a high melting point. The chlorine or bromine atoms in the chlorine or bromine compounds are preferably attached to aliphatic or cycloaliphatic carbon chains. Examples of suitable organic bromine compounds are: tetrabromobutane, dibromoethylbenzene, dibromopropanol or esters or acetals of dibromopropanol such as tris-(dibromopropyl) phosphate, and also pentabromodiphenyl ether. Organic compounds which are of low volatility, which exert little or no plasticizing action and which do not have an unpleasant odor are particularly suitable. These include particularly the bromination products of butadiene or isoprene oligomers or polymers, for example, 1,2,5,6,9,10-hexabromocyclododecane, octabromohexadecane or brominated natural or synthetic rubber. The bromine compounds are used in amounts such that the plastics compositions have a bromine content of at least 0.5% by weight. In most cases it is not necessary for the compositions to contain more than 5% by weight of bromine. The compositions advantageously contain from 1 to 3% by weight of bromine.

Examples of suitable organic chlorine compounds are low molecular weight chlorine compounds, such as hexachlorocyclododecane, hexachlorocyclopentadiene, hexachloroendomethylenetetrahydrophthalic acid, tetrachlorobutyrolactone and tetrachlorobutanediol diacetate. High molecular weight chlorine-containing compounds which have little or no effect on the properties of the styrene polymers are particularly suitable. Examples of these compounds are polyvinyl chloride, afterchlorinated polyvinyl chloride or polyvinylidene cholride which have a chlorine content of from 56.8 to 73.2% by weight and chlorinated polyisobutylene having a chlorine content of about 40 to 50% by weight. Chlorinated paraffins having a chlorine content of 60 to 75% by weight whose carbon chain contains at least eighteen to forty carbon atoms are also particularly suitable. In all cases it is expedient to use chlorine compounds having a high chlorine content in order to keep the amount thereof in the plastics composition to a minimum. The chlorine compounds are added to the plastics compositions in such amounts that the latter have a chlorine content of at least 2% by weight. In most cases it is not necessary for the compositions to contain more than 7% by weight of chlorine. The compositions preferably contain from 3 to 6% by weight of chlorine.

Tht amount of lead naphthenate or iron naphthenate contained in the plastics compositions can vary from about 0.01 to 5% by weight based on the weight of the composition, and preferably is from 0.1 to 2% by weight.

The plastics composition may be processed into self-extinguishing moldings or profiles, for example, by injection molding or extrusion. When dissolved in organic solvents, the plastics compositions are also suitable as flame-retardant lacquers, for example, for painting wood or metals. By reason of their relatively low content of organic halogen compounds, the molding materials according to this invention have softening points which differ only slightly from those of the polymers contained therein.

Plastics compositions which are suitable for the production of self-extinguishing expandable materials have particular importance. These contain an expanding agent (D). Expanding agents (D) are defined as normally gaseous or liquid hydrocarbons or halohydrocarbons or substances which disengage gaseous substances at a given temperature. Aliphatic hydrocarbons and chlorofluorohydrocarbons whose boiling points are below the softening point of the polymer, preferably from −10° to +50° C., and which do not dissolve the polymer, are particularly suitable. The expanding agent may be present in the expandable plastics compositions in amounts of 2 to 20%, preferably 3 to 10%, by weight with reference to the plastics composition. Self-extinguishing expanded plastics moldings may be prepared from the said expandable plastics compositions by heating fine particles of these compositions in gas-permeable molds to temperatures above the softening point of the polymer contained in the composition so that the particles expand and fuse together to form moldings. These expandable plastics compositions may also be processed into foam sheeting by means of extruders.

Other components may be contained in the plastics compositions, for example, fillers, color pigments, lubricants, plasticizers, antistatics, antiagers or stabilizers.

For the production of the plastics compositions, the lead naphthenate or iron naphthenate may be mixed together or successively with the styrene polymer and if desired with other components. For example, they may be incorporated into the plastics on rollers, in extruders or in kneaders. In many cases they may be added to the monomers prior to polymerization. It is also possible, for example, in the production of cast films and sheeting, to add the metal salt of the organic acid and the halogen compound to a solution of the plastic and then to evaporate the solvent.

The fact that the lead naphthenate or iron naphthenate does not disturb the polymerization is a particular advantage. Some of the compounds activate decomposition of the peroxide catalysts. The monomers may, therefore, be polymerized in the presence of the metal salts and of the organic halogen compounds for the production of the self-extinguishing plastics compositions according to this invention. In this way a particularly homogeneous dispersion of the flameproofing agents and the metal salts in the composition takes place. Sometimes the polymerization of the monomers may be carried out at substantially lower temperatures than in the absence of the salts.

The self-extinguishing properties of the molding materials are tested in the following way: to test unexpanded plastics compositions, moldings having the dimensions 0.1 x 3 x 12 cm., and to test expanded plastics compositions, moldings having the dimensions 3 x 3 x 12 cm. are held for five seconds in the nonluminous flame of a bunsen burner and then removed from the flame with a gentle movement. The time taken by the molding to become self-extinguished after removal from the flame is a measure of its flame retardancy. An extinction period of 0 to 2 seconds is regarded as very good and one of 2 to 5 seconds as good. Extinction times of less than ten seconds are regarded as adequate. Molding materials that have an insufficient self-extinguishing finish or none at all will burn completely after removal from the flame.

The following examples will further illustrate this invention. The parts specified in the examples are parts by weight; the K-values are determined by the method of H. Fikentscher, Cellulosechemie, 13 (1932), page 60.

EXAMPLE 1

20 parts of polystyrene (K-value 60), 3 parts of pentane and the amount of one of the metal salts and one of the halogen compounds as set out in the following Table 1 are dissolved in 80 parts of methylene chloride. Cast films are prepared from the solutions in the conventional way. The films remaining after the solvent has evaporated are expanded in boiling water. The flame retardancy of the films is tested as described above, after they have been dried. The table gives the extinction times ascertained for the samples.

TABLE 1

| Metal salt | Parts | Halogen compound | Parts | Extinction time of the film (seconds) |
|---|---|---|---|---|
| Iron naphthenate. | 0.06 | Chloroparaffin (Cl=70%). | 1.6 | 5. |
|  |  | do | 1.6 | Burns on. |
| Lead naphthenate. | 0.1 | Hexabromocyclododecane. | 0.4 | 3. |
|  |  | do | 0.6 | 20. |

EXAMPLE 2

0.1 part of azodiisobutyronitrile, one of the metal salts given in Table 2 and one of the halogen compounds are dissolved in 20 parts of styrene. The mixtures are heated for four hours at 70° C., three hours at 100° C., and three hours at 150° C. The polymers obtained are then dissolved in 60 parts of methylene chloride. Three (3) parts of pentane is added to the solutions from which expanded films are prepared as described in Example 1. These are tested as described above.

TABLE 2

| Metal salt | Parts | Halogen compound | Parts | K-value | Extinction time of the film (seconds) |
|---|---|---|---|---|---|
| Lead naphthenate | 0.05 | Hexabromocyclododecane. | 0.4 | 43.7 | 5. |
|  | 0.1 | do | 0.4 | 43.3 | 3. |
|  |  | do | 0.4 | 39.8 | Burns on. |
| Iron naphthenate | 0.4 | Chloroparaffin (Cl=70%). | 1.6 | 26.5 | Zero. |
|  | 0.1 | do | 1.6 | 26.0 | Do. |
|  | 0.05 | do | 1.6 | 31.5 | 3. |
|  |  | do | 1.6 | 35.4 | Burns on. |

EXAMPLE 3

1940 parts of styrene mixed with 40 parts of hexabromocyclododecane, 200 parts of petroleum ether, 8.8 parts of azodiisobutyronitrile and 20 parts of lead naphthenate are suspended in 4000 parts of water containing 4 parts of polyvinyl pyrrolidone having a K-value of 90 dissolved therein are heated in a stirred autoclave for thirty hours at 70° C. The polymer in the resultant bead plastics composition has a K-value of 67.0

The bead composition is expanded with steam to a bulk density of 20 g./l. After the expanded composition has been kept for twenty-four hours, it is heated in a gas-permeable mold with superheated steam so that the particles expand further and fuse together to form a molding. A molding tested by the above method is self-extinguished eight seconds after having been removed from the flame.

Foam articles prepared from a composition containing no lead naphthenate, but otherwise containing the same components, continue to burn when removed from the extraneous flame.

EXAMPLE 4

The extreme effectiveness of either (a) an organic bromine compound and lead naphthenate, or (b) an organic chlorine compound and iron naphthenate is demonstrated in the subject example. The self-extinguishing properties of molded compositions consisting of polystyrene containing the subject combinations of flame-retarding agents is demonstrated from the experimental results set forth below. The test was carried out in the manner described above.

| Fe-naphthenate [percent] | Chloroparaffin [70% Cl] [percent] | Extinction time [sec.] |
|---|---|---|
| 0.1 | 3.5 | 2.5 |
| 0.2 | 7.5 | 1 |
| SbCl₄·acetylacetonate [percent] | | |
| 0.1 | 3.5 | 12.1 |
| 0.5 | 3.5 | 10.6 |
| Pb-naphthenate [percent] | Hexabromocyclododecane [percent]. | |
| 0.05 | 1.0 | 3.1 |
| SbCl₄·acetylacetonate [percent] | | |
| 0.1 | 1.0 | >30 |
| 0.5 | 1.0 | >30 |
| Pb-naphthenate [percent] | Chloroparaffin [70% Cl] [percent]. | |
| 0.1 | 3.5 | >30 |

We claim:
1. A self-extinguishing plastics composition comprising
   (A) a styrene polymer selected from the group consisting of polystyrene and copolymers of styrene and a monomer selected from the group consisting of acrylonitrile, methacrylonitrile, esters of acrylic and methacrylic acid with alcohols having one to eight carbon atoms, fumaric esters of alcohols having one to eight carbon atoms, vinylcarbazole, vinylidene chloride, butadiene, divinylbenzene and mixtures thereof, said styrene polymer containing at least 50% by weight of styrene units,
   (B) 0.5–5% by weight of an organic bromo compound selected from the group consisting of tetrabromobutane, dibromoethylbenzene, esters and acetals of dibromopropanol, pentabromodiphenyl ether, bromination product of butadiene and isoprene oligomers and polymers, brominated natural rubber, said brominated compounds containing between 40 and 75% by weight of bromine, and
   (C) 0.01 to 5% by weight, with reference to said composition, of lead naphthenate.

2. A self-extinguishing plastics composition comprising
   (A) a styrene polymer selected from the group consisting of polystyrene and copolymers of styrene and a monomer selected from the group consisting of acrylonitrile, methacrylonitrile, esters of acrylic and methacrylic acid with alcohols having one to eight carbon atoms, fumaric esters of alcohols having one to eight carbon atoms, vinylcarbazole, vinylidene chloride, butadiene, divinylbenzene and mixtures thereof, said styrene polymer containing at least 50% by weight of styrene units,
   (B) 2 to 7% of a chlorinated organic compound selected from the group consisting of hexachlorocyclododecane, hexachlorocyclopentadiene, hexachloroendomethylenetetrahydrophthalic acid, tetrachlorobutyrolactone, tetrachlorobutanedioldiacetate, polyvinyl chloride, chlorinated polyvinyl chloride, polyvinylidene chloride, chlorinated polyisobutylene, chlorinated paraffins, said chlorinated compounds containing between 40 and 75% by weight of chlorine, and
   (C) 0.01 to 5% by weight, with reference to said composition, of iron naphthenate.

3. A self-extinguishing plastics composition as claimed in claim 1 which contains 2 to 20% by weight, with reference to said composition, of an expanding agent selected from the group consisting of aliphatic hydrocarbons, chlorohydrocarbons and chlorofluorohydrocarbons having a boiling point which is below the softening point of said polymer (A).

4. A self-extinguishing plastics composition as claimed in claim 2 which contains 2 to 20% by weight, with reference to said composition, of an expanding agent selected from the group consisting of aliphatic hydrocarbons, chlorohydrocarbons and chlorofluorohydrocarbons having a boiling point which is below the softening point of said polymer (A).

References Cited
UNITED STATES PATENTS

| 2,636,867 | 4/1953 | Humfeld | 260—23S |
| 2,924,532 | 2/1960 | Dereich | 260—F.P. Dig. |
| 2,996,528 | 8/1961 | Marks et al. | 260—F.P. Dig. |
| 3,031,425 | 4/1962 | Schoepfle et al. | 260—F.P. Dig. |
| 3,093,599 | 6/1963 | Mueller et al. | 260—F.P. Dig. |
| 3,211,768 | 10/1965 | Considine | 260—F.P. Dig. |

MURRAY TILLMAN, Primary Examiner

M. FOELAK, Assistant Examiner

U.S. Cl. X.R.

260—45.75, 45.85, 93.5